United States Patent
Belansky et al.

(10) Patent No.: US 9,871,598 B2
(45) Date of Patent: Jan. 16, 2018

(54) POWER BY-LIGHT ARCHITECTURE FOR OPTICALLY REMOTE ANALOG-TO-DIGITAL CONVERTERS

(71) Applicant: RAYTHEON COMPANY, Waltham, MA (US)

(72) Inventors: Richard H. Belansky, Yorba Linda, CA (US); Cecil Vergel De Dios, Torrance, CA (US); Joseph L. Pikulski, Westlake Village, CA (US)

(73) Assignee: RAYTHEON COMPANY, Waltham, MA (US)

( * ) Notice: Subject to any disclaimer, the term of this patent is extended or adjusted under 35 U.S.C. 154(b) by 348 days.

(21) Appl. No.: 14/719,033

(22) Filed: May 21, 2015

(65) Prior Publication Data
US 2016/0341921 A1 Nov. 24, 2016

(51) Int. Cl.
*H04B 10/80* (2013.01)
*H02J 17/00* (2006.01)
*H02J 50/30* (2016.01)
*G02B 6/42* (2006.01)

(52) U.S. Cl.
CPC ............ *H04B 10/807* (2013.01); *H02J 50/30* (2016.02); *G02B 6/4296* (2013.01)

(58) Field of Classification Search
CPC ............... H02J 50/30; H04B 10/25753; H04B 10/25758; H04B 10/25759; H04B 10/807
See application file for complete search history.

(56) References Cited

U.S. PATENT DOCUMENTS

| | | | | |
|---|---|---|---|---|
| 5,771,114 A | * | 6/1998 | Andersson | H04B 10/077 250/227.15 |
| 7,079,722 B2 | * | 7/2006 | Mahbobi | H04B 10/801 385/14 |
| 7,609,921 B2 | * | 10/2009 | Shimotsu | B41J 2/46 385/123 |
| 7,660,534 B2 | | 2/2010 | Al-Chalabi | |

(Continued)

OTHER PUBLICATIONS

Goutzoulis et al., "Development and Antenna Range Demonstration of an Eight-Element Optically Powered Directly Modulated Receive UHF Fiberoptic Manifold," Journal of Lightwave Technology, 14(11):2499-2505, Nov. 1996.

(Continued)

*Primary Examiner* — Ryan Johnson
(74) *Attorney, Agent, or Firm* — Lewis Roca Rothgerber Christie LLP (57) ABSTRACT

A system of delivering power by light, through a fiber. A system for remote operation of an instrument includes a fiber-coupled power laser source, which has an output fiber with a first core diameter. A fiber taper having a wide end and a narrow end, is used to connect the fiber-coupled power laser source to a system fiber having a second core diameter less than the first core diameter. The system fiber delivers optical power to the remote module, in which a fiber-coupled photovoltaic assembly having an input fiber connected to the system fiber, converts the received light to electrical power. The photovoltaic assembly has a first electrical output and a second electrical output, and the photovoltaic assembly is configured to supply power at a first voltage at the first electrical output, and to supply power at a second voltage at the second electrical output.

18 Claims, 7 Drawing Sheets

(56) References Cited

U.S. PATENT DOCUMENTS

| | | |
|---|---|---|
| 7,813,646 B2 | 10/2010 | Furey |
| 7,965,948 B1 | 6/2011 | Bugash et al. |
| 8,787,752 B2 | 7/2014 | Scherer et al. |
| 8,917,996 B2 | 12/2014 | Belansky et al. |
| 2008/0235418 A1* | 9/2008 | Werthen ............... H04B 10/807 710/106 |
| 2013/0336656 A1* | 12/2013 | Belansky ........... H04B 10/0779 398/79 |

OTHER PUBLICATIONS

Thomas et al., "Fully Powered-over-Fibre Remote Antenna Unit," IEEE, pp. 102-105, 2008.

Wake et al., "An Optically Powered Radio over Fiber Remote Unit using Wavelength Division Multiplexing," IEEE, pp. 197-200, 2008.

Wake et al., "Optical Powering of Remote Units for Radio over Fiber Links," IEEE, pp. 29-32, 2007.

* cited by examiner

POWER BY-LIGHT ARCHITECTURE FOR OPTICALLY REMOTE ANALOG-TO-DIGITAL CONVERTERS

BACKGROUND

1. Field

One or more aspects of embodiments according to the present invention relate to remote operation of instruments, and more particularly to a system and method for delivery of power over optical fiber to remote circuitry.

2. Description of Related Art

In applications in which an instrument or a remote module is remote from backend equipment, communications between the instrument and the backend equipment may be conducted over optical fibers. Such an arrangement may provide improved data security, and immunity from electromagnetic interference (EMI). Power may also be provided to a remote instrument via an optical fiber. Certain instruments, such as radio frequency (RF) circuits including analog to digital converters (ADCs), however, may require power at more than one voltage, and may require more power than related art power-over-fiber systems have the capacity to provide. Thus, there is a need for a power-by-light system providing power at more than one voltage, and providing sufficient power to power an analog to digital converter and other electronic components in a remote instrument.

SUMMARY

A system for remote operation of an instrument includes a fiber-coupled power laser source, which has an output fiber with a first core diameter. A fiber taper provides a transition to connect the fiber-coupled power laser source to a system fiber having a fiber core diameter less than the power laser fiber core diameter. The system fiber delivers optical power to the remote module, in which a fiber-coupled photovoltaic assembly that has an input fiber connected to the system fiber converts the received light to electrical power. The photovoltaic assembly has a first electrical output and a second electrical output, and the photovoltaic assembly is configured to supply power at a first voltage at the first electrical output, and to supply power at a second voltage at the second electrical output.

According to an embodiment of the present invention there is provided a system for remote operation of an instrument, the system including: a fiber-coupled power laser source, the power laser source having an output fiber with a first core diameter; a fiber taper having a wide end and a narrow end, the wide end being connected to the output fiber of the power laser source, a system fiber having a second core diameter less than the first core diameter, the system fiber being connected to the narrow end of the fiber taper; and a fiber-coupled photovoltaic assembly having an input fiber connected to the system fiber, the photovoltaic assembly having a first electrical output and a second electrical output, the photovoltaic assembly being configured to supply power at a first voltage at the first electrical output, and to supply power at a second voltage at the second electrical output.

In one embodiment, the fiber-coupled power laser source is configured to deliver at least 4 W of optical power through the output fiber.

In one embodiment, the first core diameter is greater than 62.5 microns.

In one embodiment, the second core diameter is substantially equal to 62.5 microns.

In one embodiment, the first voltage is substantially equal to 2 V.

In one embodiment, the second voltage is substantially equal to 3 V.

In one embodiment, the system fiber has a length greater than 500 m.

In one embodiment, the wide end of the fiber taper is connected to the output fiber of the fiber-coupled power laser source with a splice.

In one embodiment, the narrow end of the fiber taper is connected to the system fiber with a splice.

In one embodiment, the system fiber is connected to the input fiber of the fiber-coupled photovoltaic assembly with a splice.

In one embodiment, the fiber-coupled power laser source is configured to emit light with a wavelength substantially equal to 808 nanometers (nm).

In one embodiment, the narrow end of the fiber taper has a numerical aperture of about 0.275.

In one embodiment, the wide end of the fiber taper has a numerical aperture of about 0.164.

In one embodiment, the output fiber of the power laser source has a core diameter of about 105 microns.

In one embodiment, the output fiber of the power laser source has a numerical aperture of about 0.164.

In one embodiment, the output fiber of the power laser source has a numerical aperture less than 0.164.

In one embodiment, the system further includes an analog to digital converter (ADC).

In one embodiment, the first electrical output of the fiber-coupled photovoltaic assembly is connected to the ADC.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a power-by-light architecture for optically remote analog-to-digital converters provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Applications including antenna remoting and multiple sensing elements may benefit from having the analog to digital converter (ADC) located at the antenna. Such applications may include systems disclosed in U.S. Pat. No. 8,917,996, entitled "SIMPLIFIED SERIAL DATA OVER OPTICAL FIBER FOR REMOTE RECEIVER/SENSOR APPLICATIONS", the entire content of which is hereby incorporated herein by reference. Implementing a remote ADC using optical fibers including the delivery of power via an optical interface, and without the use of wires, may make reductions in size and weight possible, and provide EMI immunity advantages.

Commercial off-the-shelf (COTS) fiber components may be used in a power-by-light (PBL) and may provide good performance a well as cost savings over solutions with specialty or custom components.

Related art power-by-light implementations may use costly, custom, large core optical fibers for delivery of high optical power to an optical-to-electrical converter (e.g., photovoltaic cell) over short distances. Other related art power-by-light implementations may use components coupled to small core fiber to deliver relatively low optical power to the photovoltaic cell.

Embodiments of the present invention combine a high power laser source, a small core, low cost optical fiber and a high power, dual-voltage photovoltaic cell to provide the required electrical power for both the ADC and additional electronics in a physically compact remote module. High power laser sources that are capable of delivering more than 10 watts (W) out of the optical fiber coupled to the laser or lasers may use a larger core (e.g. 105 um), step-index profile fiber that is not well suited for use for long distance power delivery (e.g. power delivery over hundreds of meters). The optical attenuation (which may be measured in dB/km) of larger core, step-index (SI) fibers may be higher at wavelengths (e.g. 800 nm to 820 nm) used for high efficiency photovoltaic cells compared to, e.g., smaller core, 62.5 micron, graded-index (GI) profile fiber. In addition to lower optical loss, 62.5 micron core, GI fiber may be available as a standard COTS fiber that achieves a significant cost savings compared to other specialty fibers.

Figure 1:
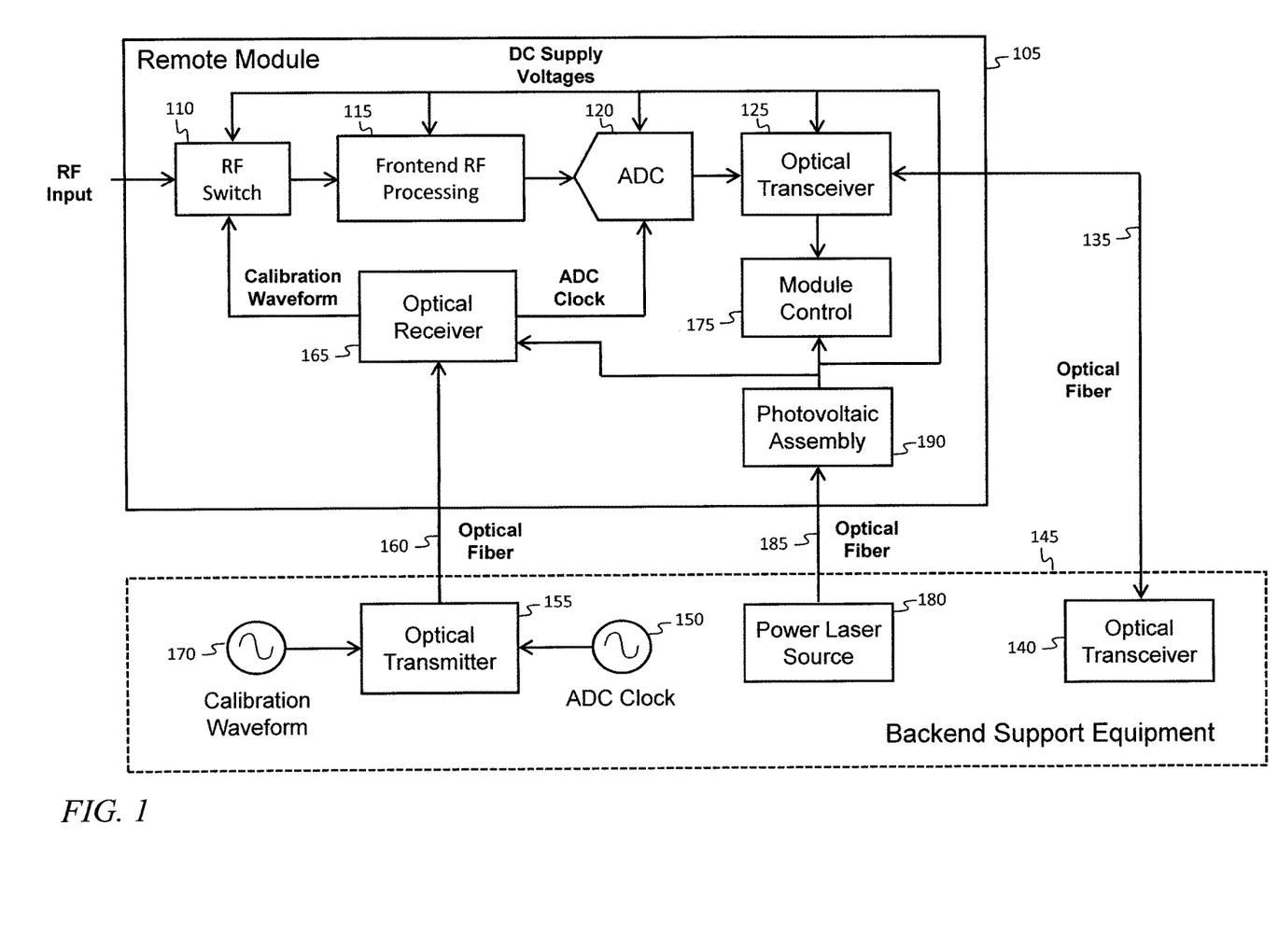
FIG. 1 is a block diagram of a backend support equipment installation and a remote module to which power is supplied over an optical fiber, according to an embodiment of the present invention.

Referring to FIG. 1, in one embodiment a remote module 105 for remote radio frequency (RF) sensing has an RF input, an RF switch 110, a frontend RF processing block 115, which may include a frequency conversion circuit and a filter, an analog to digital converter (ADC) 120, and an optical transceiver 125. An RF signal received at the RF input is processed by the RF switch 110, a frontend RF processing block 115 and the ADC 120, to produce a digital representation of the received RF signal. This digital representation is sent through a first fiber-optic link, including the remote optical transceiver 125, a first optical fiber 135 and a backend optical transceiver 140, to a backend support equipment installation 145.

The backend support equipment installation 145 may send control commands to the remote module 105 via the first fiber-optic link and through a module control block 175. For example, the backend support equipment installation 145 may, in this manner, control the RF switch 110 to transmit either the signal received at the RF input or the calibration waveform. The backend support equipment installation 145 may also send control signals to control the configuration of the frontend RF processing block 115, e.g., controlling whether frequency conversion is performed.

A clock signal from an ADC clock 150 is supplied to the ADC via a second fiber-optic link including an optical transmitter 155, a second fiber 160 and an optical receiver 165; this second fiber-optic link may also be used to provide a calibration waveform from a calibration waveform generator 170 to the RF switch 110. The calibration waveform may be used to calibrate the RF circuitry or the ADC 120 of the remote module 105. Power may be delivered to the remote module 105 through a third fiber-optic link including a power laser source 180, a third optical fiber 185, and a fiber-coupled photovoltaic assembly 190.

Figure 2:
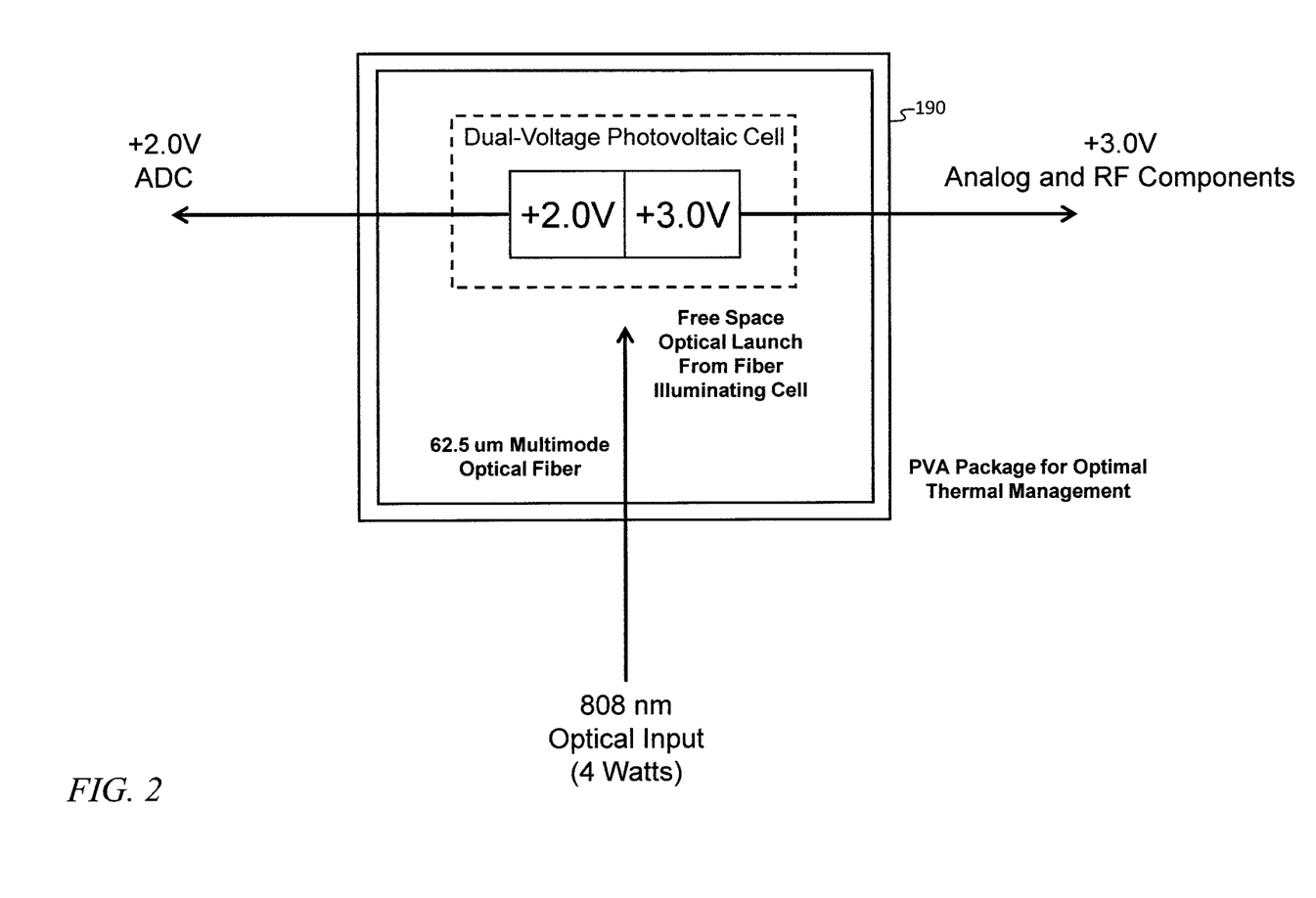
FIG. 2 is a block diagram of a dual-voltage photovoltaic assembly, according to an embodiment of the present invention.

Components within the remote module 105 may require power at different voltages. For example, the ADC 120 may require direct current (DC) power at 2.0 V, and the other circuit elements may require DC power at 3.0 V. In one embodiment, both voltages are provided by a single component, the photovoltaic assembly (PVA) 190, which may be a dual-voltage PVA. Referring to FIG. 2 the PVA may include an input fiber, which may be a multimode graded-index (GI) fiber with a core diameter of 62.5 microns, or a "62.5 micron GI fiber". The light propagating in the fiber may be launched into free space within the PVA to form a diverging beam, which illuminates a photovoltaic element including two or more photovoltaic cells, connected to provide a first output voltage (e.g., 2.0 V) and a second output voltage (e.g., 3.0 V). In one embodiment, multi junction photovoltaic cells are combined forming a multi-segment configuration to provide the dual voltage configuration. Photovoltaic cells of a given voltage may be connected in series to produce a higher voltage. Multi junction cells allow for stacking of cells if the upper cell is sufficiently transparent to allow enough light to reach the lower cell for it to operate adequately. The materials of the photovoltaic cells may be selected to provide high efficiency when illuminated with light having a wavelength of 808 nm. A thermal path having high thermal conductivity may be provided between the photovoltaic element and an exterior surface of the housing of the photovoltaic element so that any received light that is not converted to electrical power, and that may instead be dissipated as heat, may be conducted to a suitable heat sink without causing the PVA to overheat.

Figure 3:
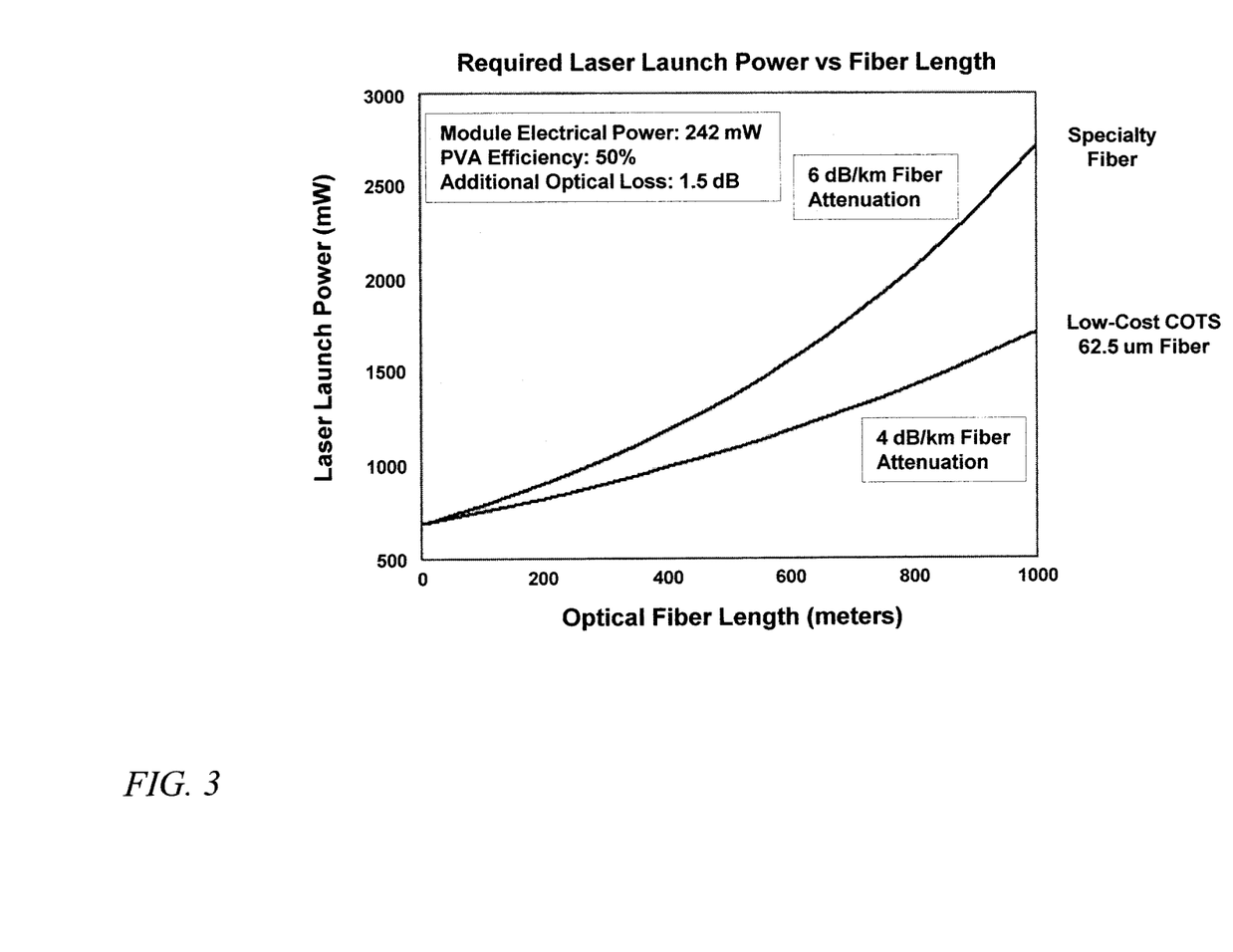
FIG. 3 is a chart of attenuation as a function of fiber length for two kinds of fiber, according to an embodiment of the present invention.

The distance between the remote module 105 and the backend support equipment installation 145 may be several hundred meters (m) or more, and a fiber may be used that has relatively low loss at the wavelength of the light used for power delivery. Referring to FIG. 3, in one embodiment a 62.5 micron GI fiber exhibits about 4 dB/km of loss at 808 nm, which may be significantly less than a specialty fiber which may, for example, cause loss of 6 dB/km.

A fiber-coupled power laser source 180 generating optical power of about 10 W may be used to generate the light for the power-by-light system implemented in the third fiber-optic-link. In one embodiment, the optical power is between 4 W and 20 W. In one embodiment, multiple laser sources generating light with a wavelength of 808 nm are coupled into the output fiber of the fiber-coupled power laser source 180. In another embodiment, several laser sources may be separately coupled to respective optical fibers, and the fibers may be combined in a fiber combiner which may have as its output the output fiber of the fiber-coupled power laser source 180. The output fiber of the fiber-coupled power laser source 180 may be a step-index (SI) fiber having a core diameter of 105 microns and a cladding diameter of 125 microns.

Figure 4:
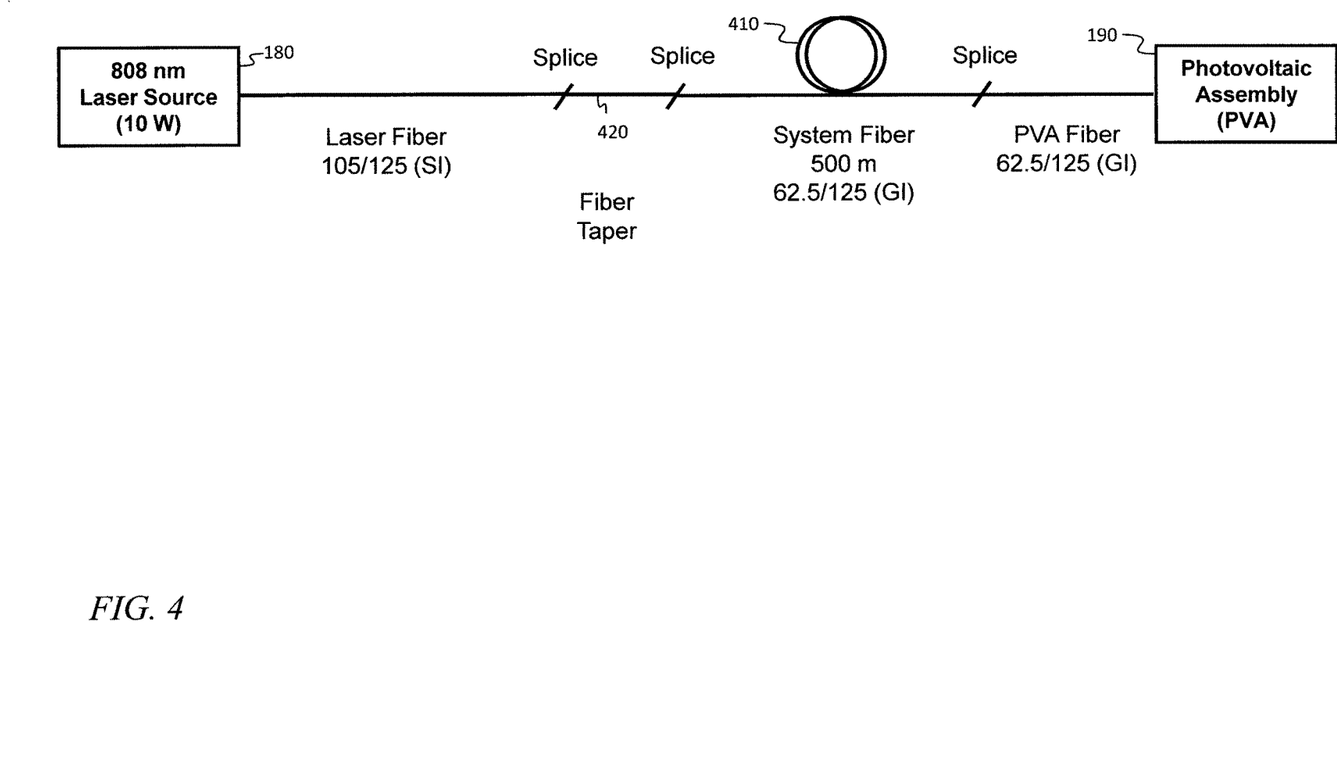
FIG. 4 is a block diagram of a fiber-optic link for delivering power to a remote module, according to an embodiment of the present invention.

Referring to FIG. 4, in one embodiment the power-by-light link (i.e., the third fiber optic link) may include an 808 nm fiber-coupled laser source generating optical power of about 10 W, a fiber taper 420, a system fiber 410 having a length of about 500 m, and a fiber-coupled PVA. The system fiber 410 may be a 62.5 micron GI fiber which may have relatively low loss, and which may also be readily available at low cost, because of its uses in commercial applications. In one embodiment, the length of the system fiber is greater or less than 500 m, and may be between 50 m and 1000 m. In embodiments with a system fiber length exceeding 500 m, a fiber-coupled laser source generating optical power of more than 10 W may be used. A fiber taper 420 may be used to guide light from the output fiber of the fiber-coupled power laser source 180 into the system fiber 410, without incurring unacceptable loss. A suitable fiber taper 420 may be obtained from Fiberguide Industries, of Stirling N.J. Fiber splices may be used to connect the output fiber of the power laser source to the fiber taper 420, to connect the fiber taper 420 to the system fiber 410, and to connect the system fiber 410 to the input fiber of the PVA.

Figure 5:
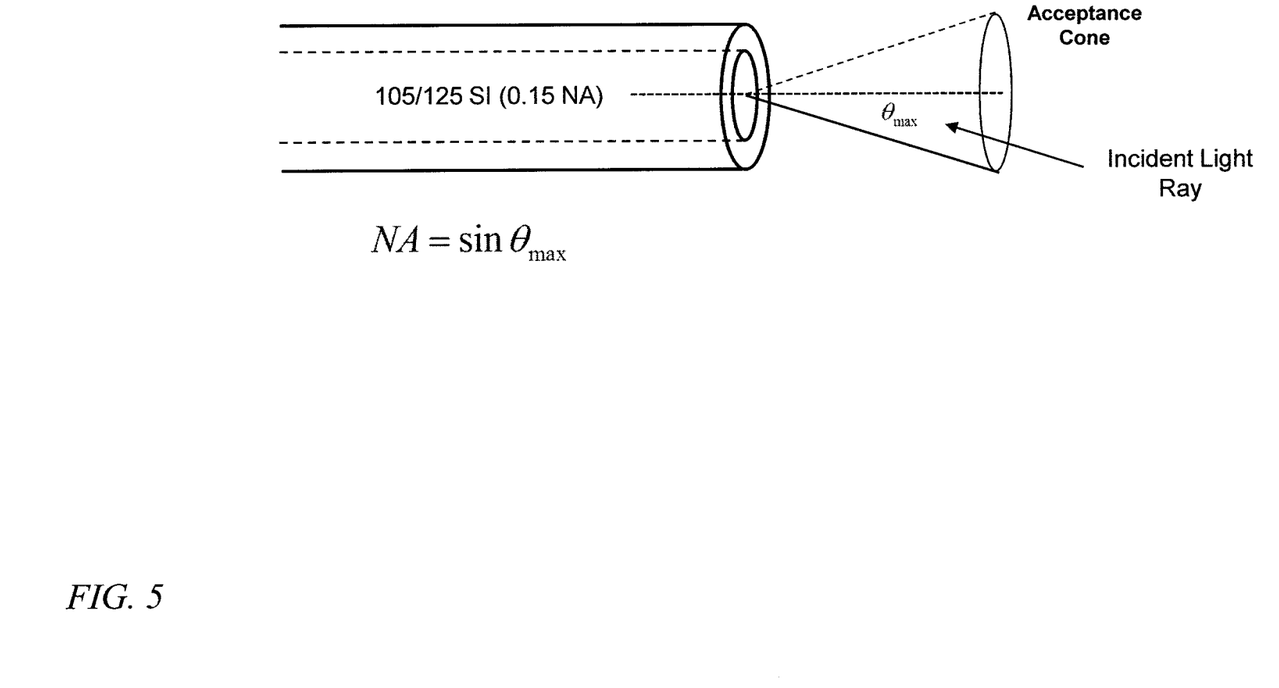
FIG. 5 is a schematic diagram illustrating the numerical aperture of an output fiber with a 105 micron core, according to an embodiment of the present invention.

Referring to FIG. 5, the output fiber of the fiber-coupled power laser source 180 may have a numerical aperture (NA) of 0.15, where the numerical aperture is defined as the sine of the half-angle $\theta_{max}$ of the acceptance cone; $\theta_{max}$ may be referred to as the acceptance angle. The NA describes the coupling losses of the light entering the fiber and depends on the indices of refraction of the core and cladding and, for an untapered fiber, is independent of the fiber core radius. Thus, a smaller numerical aperture corresponds to a smaller acceptance angle of the fiber to incoming light. The angle $\theta_{max}$ may also be the maximum angle from the axis for a direction from which light may couple efficiently into the fiber (or to which light may couple efficiently out of the fiber).

Figure 6:
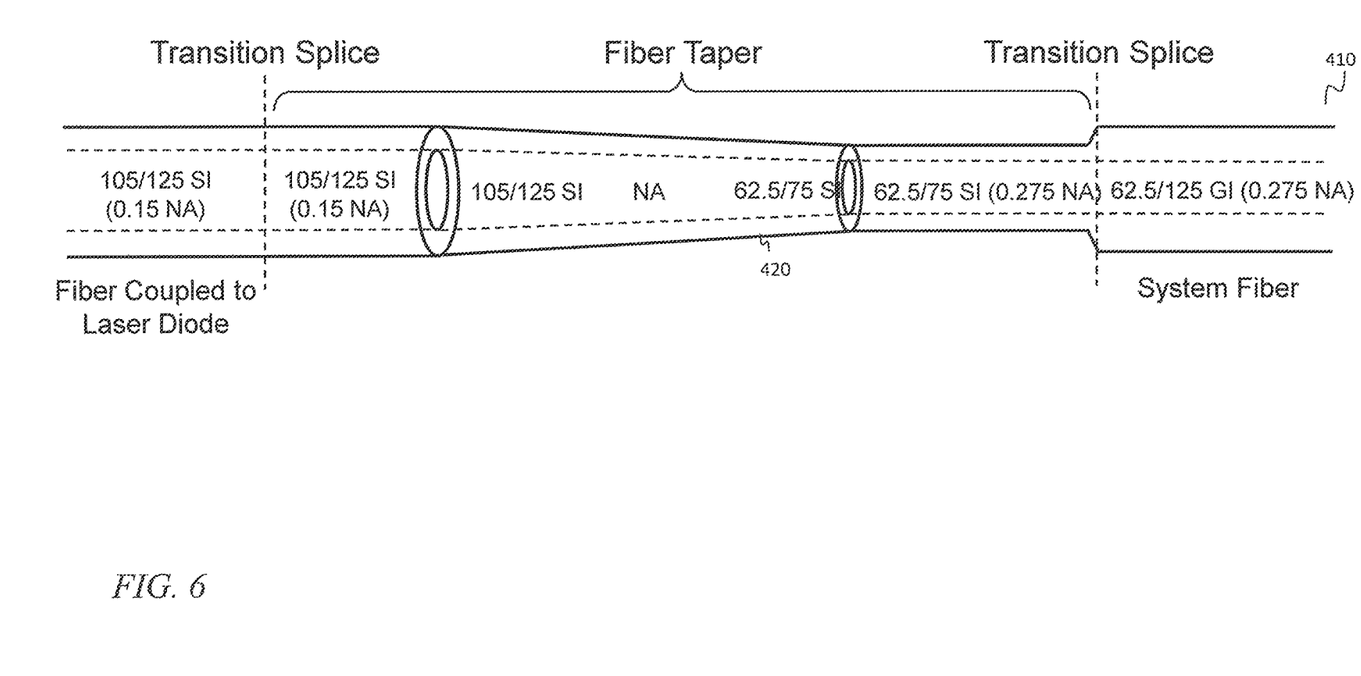
FIG. 6 is a schematic diagram of a fiber taper used to connect two different fibers, according to an embodiment of the present invention.

Referring to FIG. 6, the fiber taper 420 may essentially be a numerical aperture converter (NA increases as light travels through the taper), which may provide a transition from a large core fiber to a small core fiber, thus minimizing optical loss and reducing the launching of cladding modes in the small core fiber. The ratio of the cladding diameter to the core diameter may remain nearly constant along the length of the taper, and the relationship of the NA for the input fiber to the taper and the NA for the output fiber may depend on taper ratio R as follows:

$$NA_{OUTPUT} = R * NA_{INPUT}$$

where the taper ratio is $$R = \frac{\text{Input Core Diameter (microns)}}{\text{Output Core Diameter (microns)}}.$$

Figure 7:
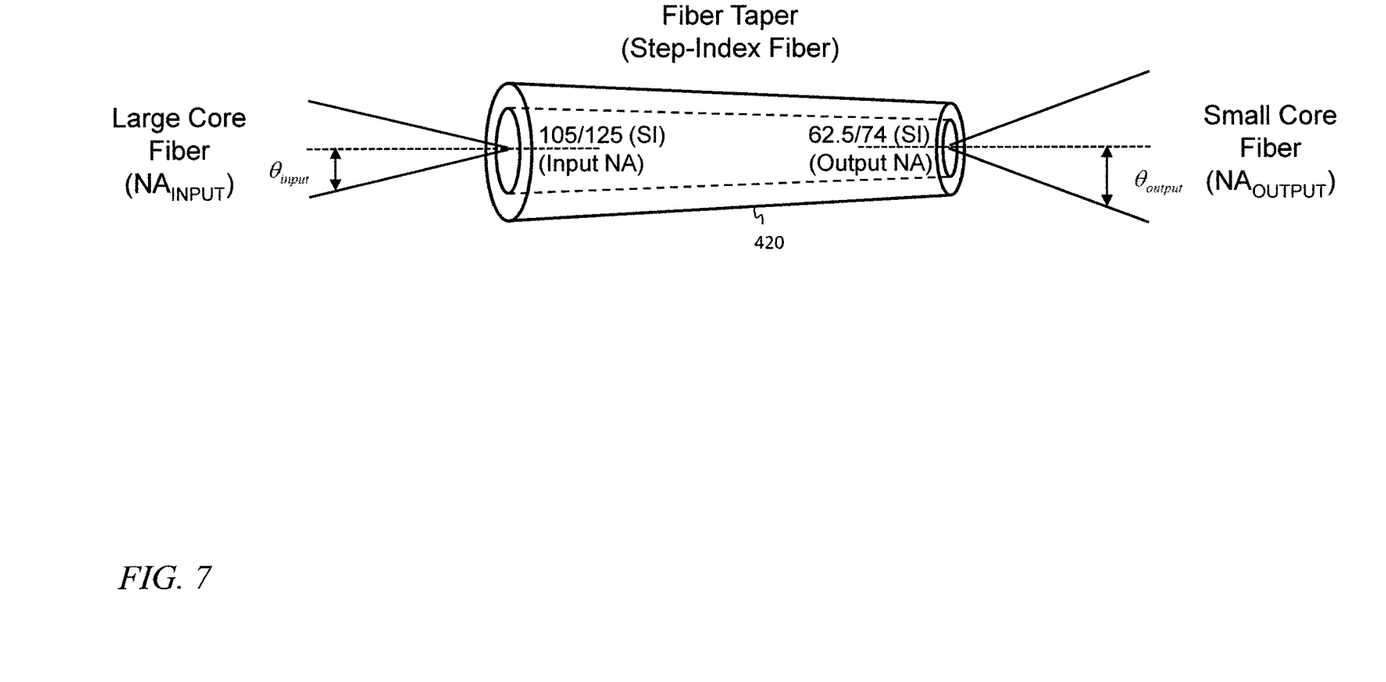
FIG. 7 is a schematic diagram illustrating the numerical aperture of each end of a fiber taper with a 105 micron core at the wide end of the fiber taper and a 62.5 micron core at the narrow end of the fiber taper.

For example, using $$R = \frac{\text{Input Core Diameter (microns)}}{\text{Output Core Diameter (microns)}} = \frac{105 \text{ microns}}{62.5 \text{ microns}},$$

and $NA_{OUTPUT}=0.275$ (corresponding to a 62.5 micron GI fiber), an input fiber to the taper (i.e., an output fiber from the fiber-coupled power laser source 180) with a numerical aperture of $NA_{INPUT} \le 0.164$ may be used, for efficient coupling from the fiber-coupled power laser source 180 to the system fiber 410. FIG. 7 illustrates dimensions, and acceptance angles, of an exemplary fiber taper.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration.

As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although limited embodiments of a power-by-light architecture for optically remote analog-to-digital converters have been specifically described and illustrated herein, many modifications and variations will be apparent to those skilled in the art. Accordingly, it is to be understood that a power-by-light architecture for optically remote analog-to-digital converters employed according to principles of this invention may be embodied other than as specifically described herein. The invention is also defined in the following claims, and equivalents thereof.

What is claimed is:

1. A system for remote operation of an instrument, the system comprising:
   a fiber-coupled power laser source, the power laser source having an output fiber with a first core diameter;
   a fiber taper having a wide end and a narrow end, the wide end being connected to the output fiber of the power laser source,
   a system fiber having a second core diameter less than the first core diameter, the system fiber being connected to the narrow end of the fiber taper; and
   a fiber-coupled photovoltaic assembly having an input fiber connected to the system fiber, the photovoltaic assembly having a first electrical output and a second electrical output, the photovoltaic assembly being configured to supply power at a first voltage at the first electrical output, and to supply power at a second voltage at the second electrical output.

2. The system of claim 1, wherein the fiber-coupled power laser source is configured to deliver at least 4 W of optical power through the output fiber.

3. The system of claim 1, wherein the first core diameter is greater than 62.5 microns.

4. The system of claim 1, wherein the second core diameter is substantially equal to 62.5 microns.

5. The system of claim 1, wherein the first voltage is substantially equal to 2 V.

6. The system of claim 1, wherein the second voltage is substantially equal to 3 V.

7. The system of claim 1, wherein the system fiber has a length greater than 500 m.

8. The system of claim 1, wherein the wide end of the fiber taper is connected to the output fiber of the fiber-coupled power laser source with a splice.

9. The system of claim 1, wherein the narrow end of the fiber taper is connected to the system fiber with a splice.

10. The system of claim 1, wherein the system fiber is connected to the input fiber of the fiber-coupled photovoltaic assembly with a splice.

11. The system of claim 1, wherein the fiber-coupled power laser source is configured to emit light with a wavelength substantially equal to 808 nanometers (nm).

12. The system of claim 1, wherein the narrow end of the fiber taper has a numerical aperture of about 0.275.

13. The system of claim 1, wherein the wide end of the fiber taper has a numerical aperture of about 0.164.

14. The system of claim 1, wherein the output fiber of the power laser source has a core diameter of about 105 microns.

15. The system of claim 1, wherein the output fiber of the power laser source has a numerical aperture of about 0.164.

16. The system of claim 1, wherein the output fiber of the power laser source has a numerical aperture less than 0.164.

17. The system of claim 1, wherein the system further comprises an analog to digital converter (ADC).

18. The system of claim 1, wherein the first electrical output of the fiber-coupled photovoltaic assembly is connected to the ADC.

* * * * *